United States Patent
Ha et al.

(10) Patent No.: US 8,297,772 B2
(45) Date of Patent: Oct. 30, 2012

(54) BACKLIGHTING ASSEMBLY FOR USE IN SLIM FLAT PANEL DISPLAY AND DISPLAY DEVICE HAVING SAME

(75) Inventors: Ju-Hwa Ha, Seoul (KR); Jung-Wook Paek, Suwon-si (KR); Nyung-Woon Lee, Seoul (KR)

(73) Assignee: Samsung Display Co., Ltd. (KR)

(*) Notice: Subject to any disclaimer, the term of this patent is extended or adjusted under 35 U.S.C. 154(b) by 527 days.

(21) Appl. No.: 12/238,015

(22) Filed: Sep. 25, 2008

(65) Prior Publication Data
US 2009/0168421 A1  Jul. 2, 2009

(30) Foreign Application Priority Data
Dec. 26, 2007 (KR) .................. 10-2007-0137367

(51) Int. Cl.
G09F 13/04 (2006.01)
(52) U.S. Cl. ............. 362/97.2; 362/217.08; 362/217.09
(58) Field of Classification Search ............ 362/97.2, 362/217.08–217.09
See application file for complete search history.

(56) References Cited

U.S. PATENT DOCUMENTS
6,913,365 B2 * 7/2005 Masaki et al. ............... 362/627
7,220,036 B2 * 5/2007 Yi et al. ........................ 362/561
2007/0182883 A1 * 8/2007 Chen et al. ..................... 349/64
2009/0284954 A1 * 11/2009 Yamada et al. .............. 362/97.2

FOREIGN PATENT DOCUMENTS
WO  WO-2007/049511 A1 * 5/2007
* cited by examiner

Primary Examiner — Diane Lee
Assistant Examiner — Sean Gramling
(74) Attorney, Agent, or Firm — Innovation Counsel LLP

(57) ABSTRACT

A backlight assembly includes a plurality of lamps, a multi-plate diffusion member, optical sheets and a receiving container. The lamps have a rod shape extended in a first direction, and are arranged along a second direction that is substantially perpendicular to the first direction. The diffusion member is disposed above the lamps and has at least two optical plates. Each of the optical plates includes a plurality of optical patterns on a surface facing away from the lamps. The optical patterns are extended in the first direction and aligned along the second direction. The optical sheets are disposed above the diffusion member to improve optical characteristics of passed through light. The receiving container includes a reflective bottom plate and a sidewall formed on an edge of the bottom plate to receive the lamps, the diffusion member and the optical sheets.

9 Claims, 8 Drawing Sheets

BACKLIGHTING ASSEMBLY FOR USE IN SLIM FLAT PANEL DISPLAY AND DISPLAY DEVICE HAVING SAME

CROSS-REFERENCE TO RELATED APPLICATIONS

The present application claims priority under 35 U.S.C. §119 to Korean Patent Application No. 2007-137367, filed on Dec. 26, 2007 in the Korean Intellectual Property Office (KIPO), the disclosure of which is herein incorporated by reference in its entirety.

BACKGROUND

1. Field of Invention

The present disclosure of invention relates to a backlight assembly and a display device having the same. More particularly, the present disclosure relates to a backlight assembly having a plurality of lamps having rod-like shapes and a relatively slim display device having the backlight assembly.

2. Description of Related Technology

A liquid crystal display (LCD) device, in general, includes an image display panel and a backlight assembly. The image display panel displays an image by selectively controlling the light transmittance of liquid crystals therein. The backlight assembly is disposed under the display panel to provide the image display panel with a source of uniformly distributed light.

One class of backlight assembly includes a plurality of lamps each having a rod shape (elongated cylinder), a single diffusion plate (rigid) provided above the lamps and one or more optical sheets (flexible) provided above the diffusion plate. The diffusion plate may include a plurality of diffusing agents to diffuse light incident into the diffusion plate from the underlying lamps.

In order to increase the luminance uniformity of the backlight assembly, distance between the lamps and the diffusion plate is generally increased, at the same time thickness of the diffusion plate is increased, and/or the density of the diffusing agents in the diffusion plate is increased so as to thereby increase the their refractive index and provide a higher degree of light refraction.

However, when the separation distance between the lamps and the diffusion plate is increased or the thickness of the diffusion plate is increased, the thickness of the backlight assembly may also be disadvantageously increased thus making it difficult to provide a slim profile display. In addition, when the density of the diffusing agents is increased, the luminance supplied by the backlight assembly may be disadvantageously decreased.

SUMMARY

The present disclosure provides a backlight assembly having decreased thickness (greater slimness) and yet capable of improving luminance and luminance uniformity.

A backlight assembly in accordance with one aspect of the present disclosure includes a plurality of lamps, a diffusion member having plural diffusion plates, optical sheets and a receiving container.

The lamps each have a rod shape (cylindrical shape) of radius R and length extended in a first direction, and they are distributively arranged along a second direction that is substantially perpendicular to the first direction. The diffusion member is disposed above the lamps by a distance D2 greater than R and the diffusion member has a plurality of stacked optical plates. Each of the stacked optical plates includes a plurality of optical patterns disposed on a surface of the plate that opposite to the lamps. The optical patterns are extended in the first direction and distributed adjacent to one another along the second direction.

The optical sheets are disposed above the multi-plate diffusion member to improve optical characteristics.

The receiving container includes a reflective bottom plate disposed a distance D1 below the axial centers of the cylindrical lamps, where D1 is greater than R, the radius of each of the lamps. The receiving container also includes one or more sidewalls formed on an edge of the bottom plate and configured to define a receiving space that receives the lamps, the multi-plate diffusion member and the optical sheets.

A distance L between axial centers of the adjacent lamps may be greater than the distance D2 between the lamps and the diffusion member by about three times to about four times (e.g., $3 \times D2 \leq L \leq 4 \times D2$).

Each of the optical patterns on each of the plural plates of the diffusion member may have a cross-section corresponding to that of an elliptical arch shape when viewed facing towards a long axis of the optical patterns, with a ratio of a short radius (minor radius, B) to a long radius (major radius, A) of an ellipse from which the elliptical arch shape is hypothetically obtained being about 1.4 to about 2.2. A length (P) of a lower side of (base of) each elliptical arch shaped optical pattern may be about 100.mu.m to about 300.mu.m, and a height of the same elliptical arch shape as seen along a longitudinal direction thereof may be about 50.mu.m to about 100.mu.m. The cross-section of the elliptical arch shape may be inscribed (as indicated in FIG. 6) with an isosceles triangle having a lower corner angle between about 36 degrees and about 48 degrees.

In one embodiment, each of the optical patterns has a cross-section of an isosceles triangular shape having a lower side (base) substantially parallel with an upper surface of the optical plate in the multi-plate diffusion member rather than having an elliptical section shape. A length of the lower side of the elliptical arch shape may be about 100 μm to about 300 μm, and a height of the elliptical arch shape along a longitudinal direction thereof may be about 50 μm to about 100 μm. A lower corner angle of the isosceles triangle may be between about 36 degrees and about 48 degrees. An apex of the isosceles triangle may have a rounded shape.

A distance L between the lamps and the multi-plate diffusion member may be greater than a distance D1 between the bottom plate and the lamps by about one time to about three times. The distance D2 between the lamps and the diffusion member may be about 7 mm to about 10 mm, and the distance D1 between the bottom plate and the lamps may be between about 3 mm to about 5 mm. The distance L between adjacent lamps may be about 18 mm to about 25 mm.

Each of the optical plates in the diffusion member may include a main core layer, an upper cladding layer on a first surface of the main core layer, where the upper cladding layer has the optical patterns on its upper surface, and a lower cladding layer on a second surface of the main core layer to face the lamps. The second surface of the main core layer may by opposite to the first surface of the main core layer.

A thickness of the main core layer may be about 0.8 mm to about 1.5 mm. A thickness of the upper cladding layer may be about 50 μm to about 150 μm, and a thickness of the lower cladding layer may be about 50 μm to about 150 μm.

A plurality of random patterns may be formed on a lower surface of the lower layer facing the lamps. An average roughness of the random patterns along a central line may be about 2 to about 4.

Each of the optical plates may include a transparent material having light transmittance of more than about 80%.

A display device in accordance with the present disclosure includes a display panel that displays an image using light and a backlight assembly disposed under the display panel to provide the display panel with light.

The backlight assembly includes a plurality of lamps, a multi-plate diffusion member, optical sheets and a receiving container. The lamps have a rod shape extended in a first direction, and are arranged along a second direction that is substantially perpendicular to the first direction. The diffusion member is disposed on the lamps and having at least two optical plates. Each of the optical plates includes a plurality of optical patterns on a surface opposite to the lamps. The optical patterns are extended in the first direction and aligned along the second direction. The optical sheets are disposed on the diffusion member to improve optical characteristics. The receiving container includes a bottom plate and a sidewall formed on an edge of the bottom plate to receive the lamps, the diffusion member and the optical sheets.

A distance L between adjacent lamps may be greater than a distance D2 between the lamps and the diffusion member by about three times to about four times.

In another embodiment, a method for dispersing light uniformly from an array of linear light sources toward a Liquid Crystal Display (LCD) flat panel is provided as follows. A plurality of stacked diffusion plates is provided between the LCD flat panel and the array of linear light sources. The lowest of the diffusion plates is a first distance (D2) above the light sources array. A reflective plate is provided at a second distance (D1) below the light sources array. Optical sheets are provided above said plurality of stacked diffusion plates. Each given one of the stacked diffusion plates has a main core layer, an upper cladding layer and a lower cladding layer. The upper cladding layer is disposed on a first surface of the main core layer and has optical patterns defined thereon for dispersing light to an area above the given diffusion plate. The lower cladding layer is disposed on a second surface of the main core layer to face a light source, the second surface of the main core layer being opposite to the first surface of the main core layer.

According to the present disclosure, at least two optical plates including optical patterns extended in a first direction are disposed above lamps having a rod shape extended in the first direction, so that the luminance uniformity of the backlight assembly may be increased by the optical plates and the thickness of the backlight assembly may nonetheless be decreased relative to a comparable backlight assembly that has only a single-plate diffusion member.

BRIEF DESCRIPTION OF THE DRAWINGS

The above and other advantages of backlight units fashioned in accordance with the present disclosure will become more apparent by describing in detail exemplary embodiments thereof with reference to the accompanying drawings, in which.

DETAILED DESCRIPTION

Figure 1:
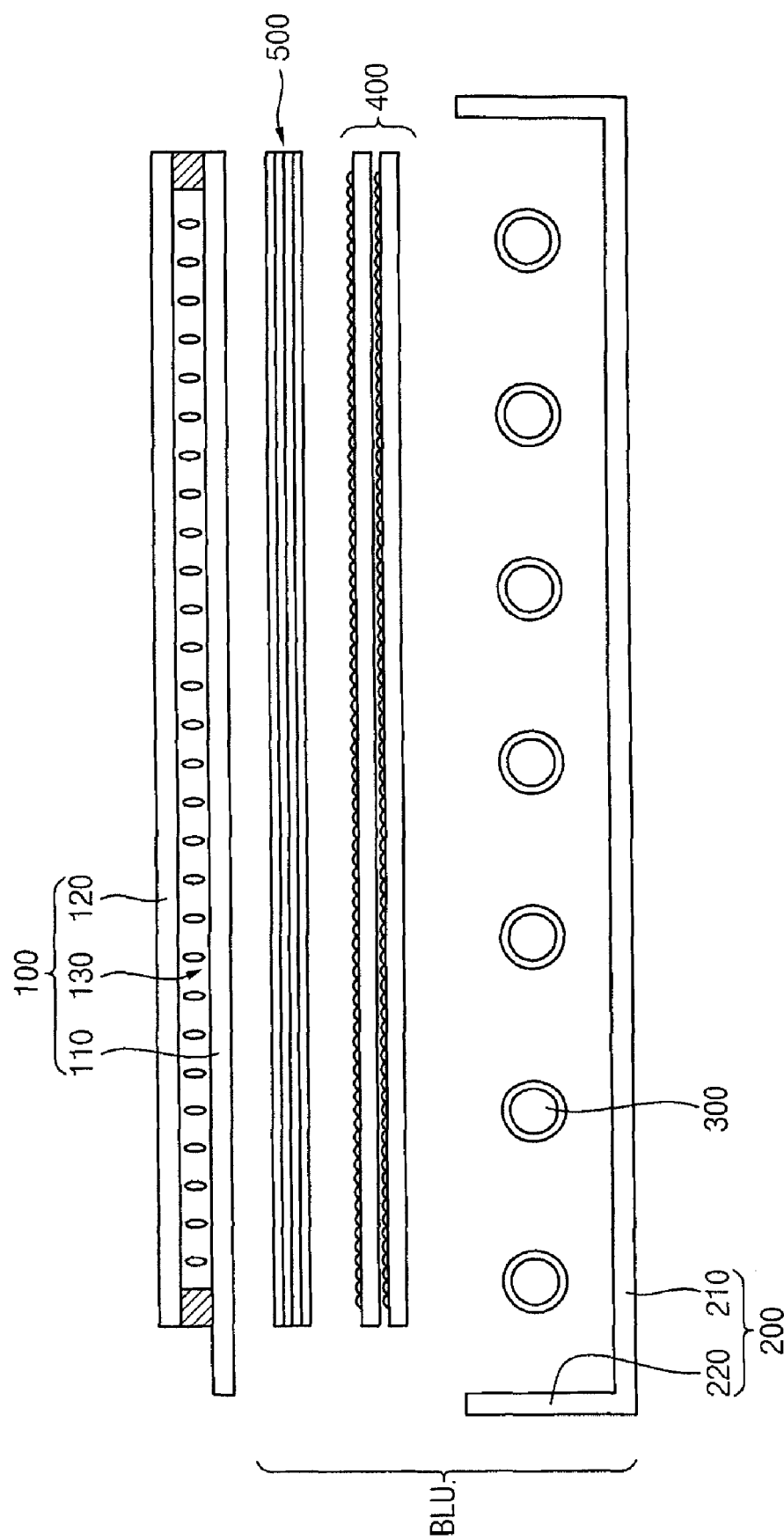
FIG. 1 is a cross-sectional view (not to scale) illustrating a first display device in accordance with one embodiment.

Various embodiments are described more fully hereinafter with reference to the accompanying drawings. This exemplary embodiments detailed here should not be construed as limiting. Rather, these embodiments are provided so that this disclosure will convey corresponding concepts to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating a display device in accordance with one embodiment.

Referring to FIG. 1, the display device includes a display panel 100 and a backlight assembly BLU. The display panel 100 displays an image using light. The backlight assembly BLU is disposed under the display panel 100 to supply the display panel 100 with light.

The display panel 100 may include a first substrate 110, a second substrate 120 and a liquid crystal layer 130. The second substrate 120 faces the first substrate 110. The liquid crystal layer 130 is interposed between the first and second substrates 110 and 120.

The first substrate 110 typically includes a plurality of gate and data lines crossing each other, a plurality of thin-film transistors (TFTs) electrically connected to the gate and data lines at their crossings and a plurality of pixel electrodes electrically connected to the TFTs.

The second substrate 120 includes a plurality of color filters corresponding to the pixel electrodes, respectively, and a transparent common electrode formed on the entire surface of the second substrate 120. For example, the color filters may include red, green and blue color filters. Alternatively, the color filters may be formed on the first substrate 110.

The liquid crystal layer 130 is interposed between the first and second substrates 110 and 120. Liquid crystals of the liquid crystal layer 130 change orientation in response to an electric field formed between the pixel electrodes and the common electrode. Thus, the light transmittance of the liquid crystal layer 130 is changed to display an image on the display panel 100.

The backlight assembly BLU includes a receiving container 200, a plurality of lamps 300, a diffusion member including at least two optical plates 400 and optical sheets 500.

The receiving container 200 includes a bottom plate 210 and a sidewall 220. The bottom plate 210 has a plate shape. The sidewall 220 is disposed on an edge of the bottom plate 210. The lamps 300, the diffusion member 400 and the optical sheets 500 may be received in a receiving space defined by the bottom plate 210 and the sidewall 220 of the receiving container 200.

The lamps 300 are spaced apart from each other by a constant distance in the receiving container 200, and are aligned substantially in parallel with each other. Each of the lamps 300 may include at least one of a cold cathode fluorescent lamp (CCFL), a hot cathode fluorescent lamp (HCFL), an external electrode fluorescent lamp (EEFL), etc.

The diffusion member 400 is disposed above the lamps 300 to diffuse the light generated from the lamps 300, thereby increasing the luminance uniformity of the light. The diffusion member 400 may include at least two optical plates, 400a and 400b stacked on one another.

The optical sheets 500 are disposed above the diffusion member, to improve optical characteristics of the light having passed through the diffusion member. For example, the optical sheets 500 may increase viewing angle, luminance uniformity, luminance, etc.

Figure 2:
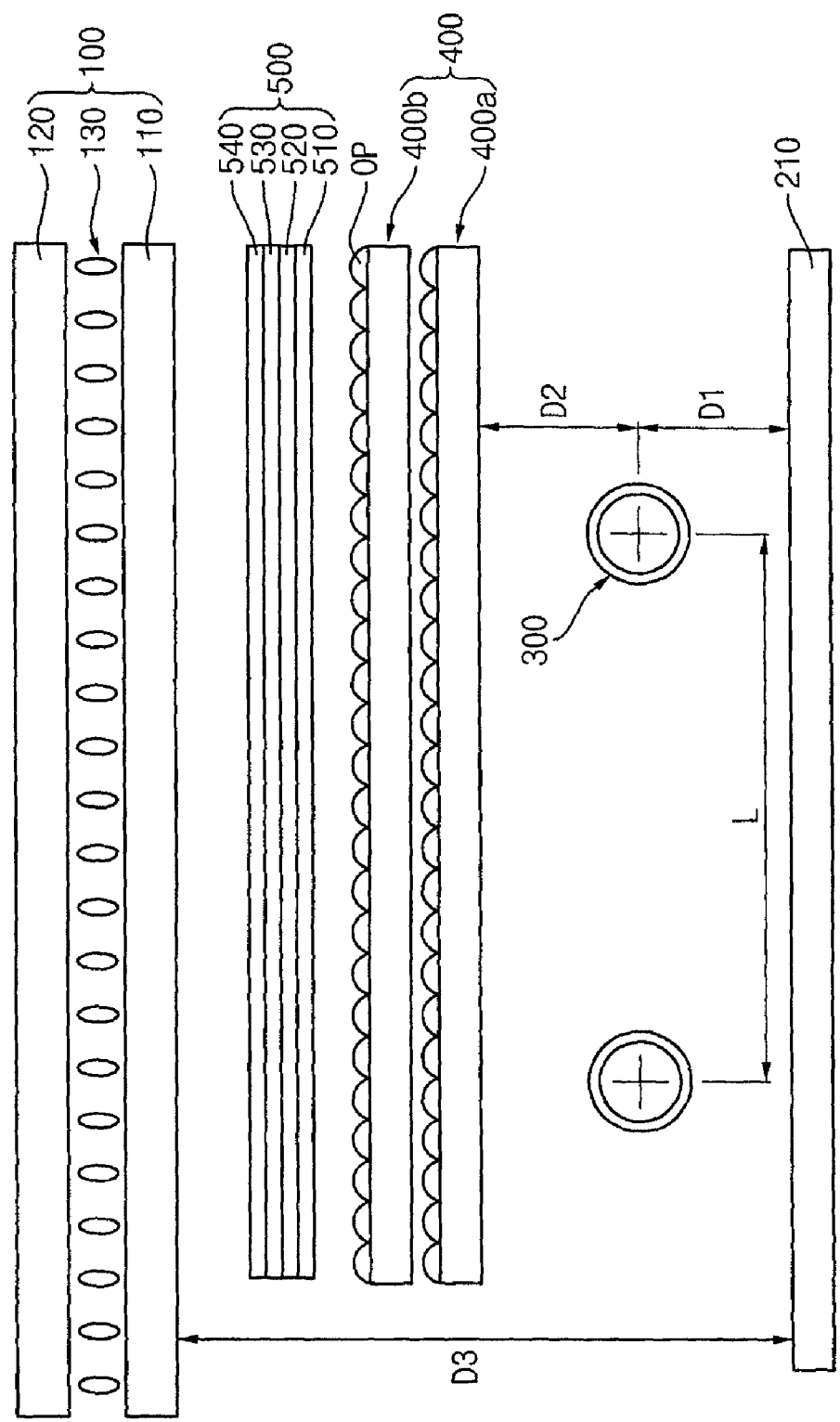
FIG. 2 is an enlarged cross-sectional view (not to scale) illustrating a portion of the display device shown in FIG. 1 with distances between various elements being designated.
Figure 3:
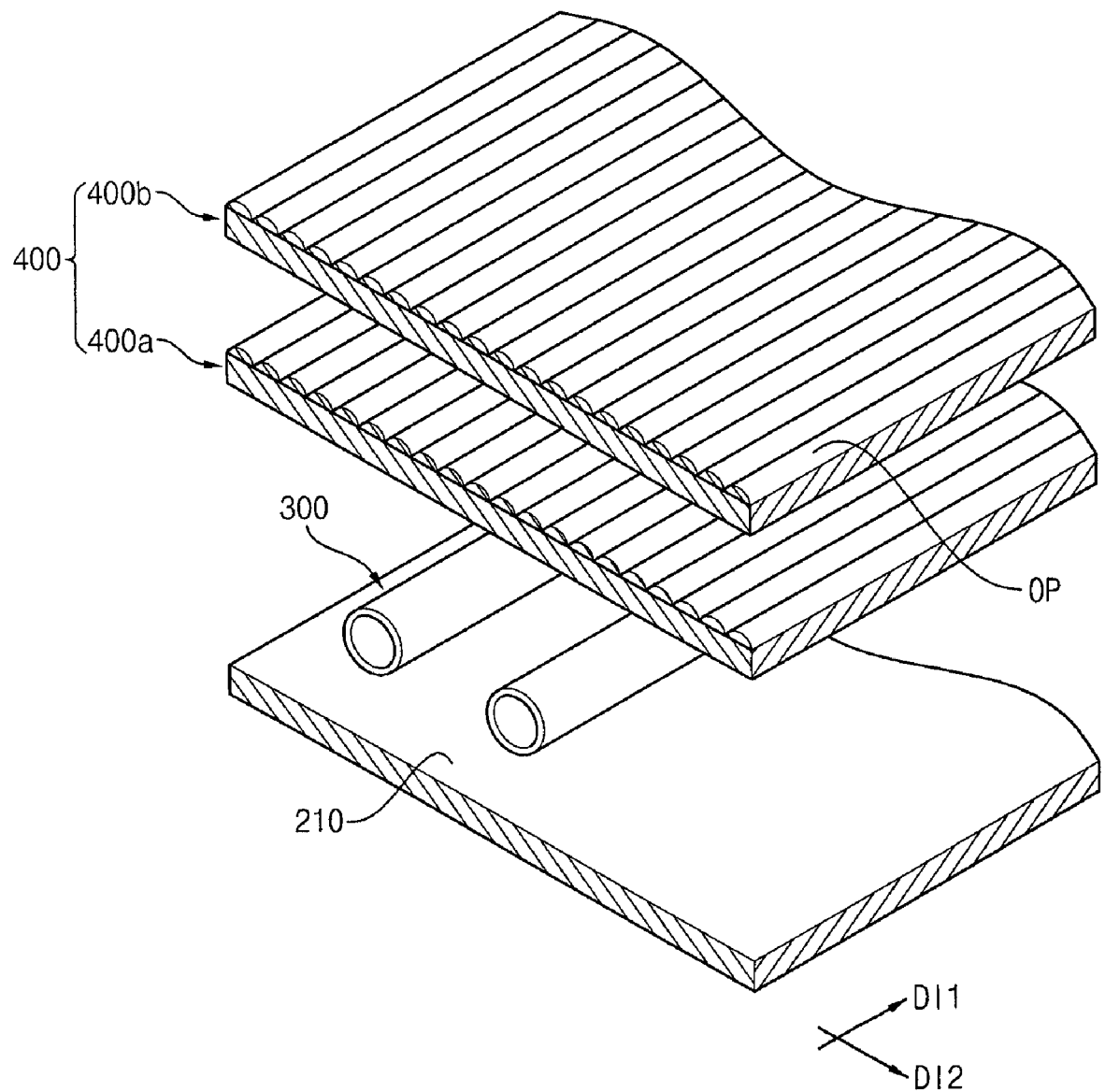
FIG. 3 is a perspective view illustrating a perspective relationship between optical patterns of the optical plates in the multi-plate diffusion member and the lamps shown in FIG. 2.

FIG. 2 is an enlarged cross-sectional view illustrating a portion of the display device shown in FIG. 1. FIG. 3 is a perspective view illustrating a relationship between optical patterns of optical plates and lamps shown in FIG. 2.

Referring to FIGS. 1 to 3, the lamps 300 each has a cylindrical or rod shape extended in a first direction DI1, and they are spaced apart from each other by a constant center-to-center distance L along a second direction DI2 that is substantially perpendicular to the first direction DI1.

In one embodiment, the distance L between the centers of adjacent lamps 300 is about 18 mm to about 25 mm. In one sub-embodiment, the distance L between the adjacent lamps 300 may be about 22 mm to about 24 mm.

A plurality of lamp supporters (not shown) may be disposed on the bottom plate 210 to support the lamps 300. The lamp supporters may include a transparent material such as glass or a plastic. The axial centers of lamps 300 are spaced apart from the bottom plate 210 by a constant distance D1 where the latter distance may be defined by the lamp supporters (not shown).

In one embodiment, the distance D1 between the bottom plate 210 and the lamps 300 is about 3 mm to about 5 mm. In one sub-embodiment, the distance D1 between the bottom plate 210 and the lamp axial centers (300) is about 3 mm to about 4 mm.

A reflective sheet (not shown) may be disposed on the bottom plate 210 to reflect the light generated from the lamps 300. Alternatively, a reflective film (not shown) may be coated on the bottom plate 210.

The diffusion member 400 is spaced apart from the lamps 300. The diffusion member includes at least two optical plates 400a, 400b.

At least one diffusion plate supporter may be disposed on the bottom plate 210 to support the diffusion member. The diffusion member may include a transparent material. The diffusion member is spaced apart from the bottom plate 210 by the diffusion plate supporter. Alternatively, the lamp supporter may be integrally formed with the diffusion plate supporter.

The lamps 300 may be spaced apart from the diffusion member by a distance D2 of about 7 mm to about 10 mm. In one embodiment, the distance D2 between the lamp axial centers (300) and the diffusion member may be about 7 mm to about 8 mm.

In one class of embodiments, the distance D2 between the lamps 300 and the diffusion member is about one to about three times greater than the distance D1 between the bottom plate 210 and the lamps 300 (e.g., D1≦D2≦3×D1). In one class of embodiments, the distance L between adjacent lamps 300 is about three to about four times greater than the distance D2 between the lamps 300 and the diffusion member (e.g., 3×D2≦L≦4×D2).

Each of the first and second optical plates 400a and 400b includes a plurality of optical patterns, OP disposed on a surface of the plate opposite to the lamps 300. For example, the optical patterns OP of the first optical plate 400a face a lower surface of the second optical plate 400b, and the optical patterns OP of the second optical plate 400b are formed on the upper surface of the second optical plate 400b.

The optical patterns OP are protruded from the upper surface of each of the first and second optical plates 400a and 400b by a predetermined height. The optical patterns OP are elongated in the first direction DI1, and are align-wise distribute along the second direction DI2.

The optical sheets 500 are aligned above the diffusion member. For example, the optical sheets 500 may include a first prism sheet 510, a diffusion sheet 520, a second prism sheet 530 and a brightness enhancement sheet 540 that are stacked with each other.

A plurality of prism patterns (not shown) of the first prism sheet 510 may be extended in the same direction as a plurality of prism patterns (not shown) of the second prism sheet 530. For example, the prism patterns of the first and second prism sheets 510 and 530 are extended in a longitudinal direction of the optical patterns OP that is substantially the same as the first direction DI1, and are aligned along the second direction DI2.

The brightness enhancement sheet 540 may include a reflective polarizing film. The reflective polarizing film transmits first light polarized in a first polarizing axis, and reflects second light polarized in a second direction that is substantially perpendicular to the first direction. The second light that is reflected from the reflective polarizing film is changed into the first light in the backlight assembly BLU, and the first light that is changed from the second light in the backlight light assembly BLU transmits back to the reflective polarizing film. Thus, the reflective polarizing film increases the luminance of the backlight assembly BLU to improve the efficiency of the light generated from the lamps 300.

The display panel 100 is disposed above the optical sheets 500. In one embodiment, a distance D3 between the bottom plate 210 and the display panel 100 is about 18 mm to about 22 mm. In one sub-embodiment, the distance D3 between the bottom plate 210 and the display panel 100 may be about 19 mm to about 20 mm.

In one embodiment, the light-generating unit which generates the light includes the lamps 300. Alternatively, the light-generating unit may include various other light sources. For example, the light may be generated from a flat fluorescent lamp, a light-emitting diode (LED) substrate, etc. The light-generating unit may have a substantially rectangular shape, a bar shape extended in a predetermined direction, etc.

Figure 4:
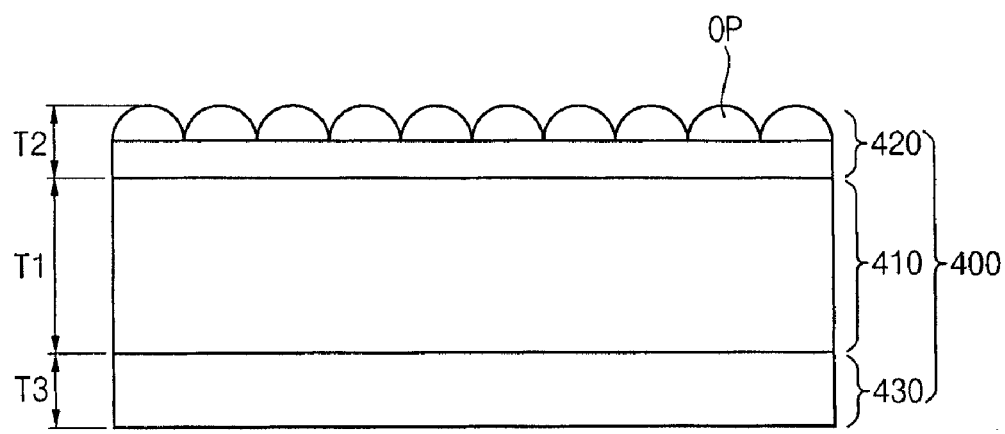
FIG. 4 is an enlarged cross-sectional view illustrating one of the optical plates of the multi-plate diffusion member shown in FIG. 2.

FIG. 4 is an enlarged cross-sectional view illustrating an optical plate shown in FIG. 2.

Referring to FIGS. 2 and 4, each of the optical plates 400 includes a main core layer 410, an upper layer 420 and a lower layer 430.

The main core layer 410 includes a transparent material having a transmittance of more than about 80%. Examples of the transparent material that may be used for the main core layer 410 include polycarbonate, polystyrene, etc.

A thickness T1 of the main core layer 410 may be about 0.8 mm to about 1.5 mm. In one class of embodiments, the thickness T1 of the main core layer 410 is about 1.0 mm to about 1.3 mm.

The upper layer 420 is formed on the main core layer 410 on a surface opposite to the lamps 300. The upper layer 420 includes a transparent material having a transmittance of more than about 80%. For example, the upper layer 420 may include substantially the same material as the main core layer 410. The optical patterns OP are formed on the upper layer 420. A thickness T2 of the upper layer 420 may be about 50 μm to about 150 μm.

The lower layer 430 is formed on a lower surface of the main core layer 410 facing the lamps 300. The lower layer 430 includes a transparent material having a transmittance of more than about 80%. For example, the lower layer 430 may include substantially the same material as the main core layer 410. A thickness T3 of the lower layer 430 may be about 50 μm to about 150 μm.

Figure 5:
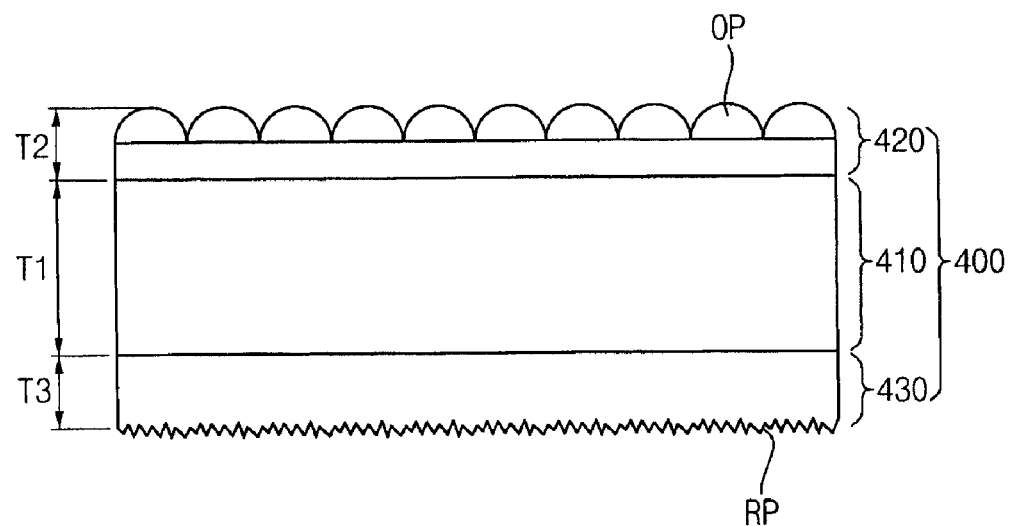
FIG. 5 is an enlarged cross-sectional view illustrating an optical plate including random base patterns.

FIG. 5 is an enlarged cross-sectional view illustrating an alternate optical plate 400 having random patterns RP.

Referring to FIG. 5, a plurality of random patterns RP may be formed on a surface of the lower layer 430 of the optical plate 400. The random patterns RP may have random heights or random shapes. When the random patterns RP are formed on the lower layer 430, a moiré phenomenon may be prevented from appearing in the light having passed through the optical plate 400.

For example, an average roughness Ra of the random patterns RP along a central line of the optical plate 400 may be about 2 to about 4. When the average roughness Ra of the random patterns RP along the central line is less than 2, the moiré phenomenon is displayed on the backlight assembly BLU. When the average roughness Ra of the random patterns RP along the central line is more than 4, the luminance uniformity of the light having passed through the optical plate 400 may be deteriorated.

Figure 6:
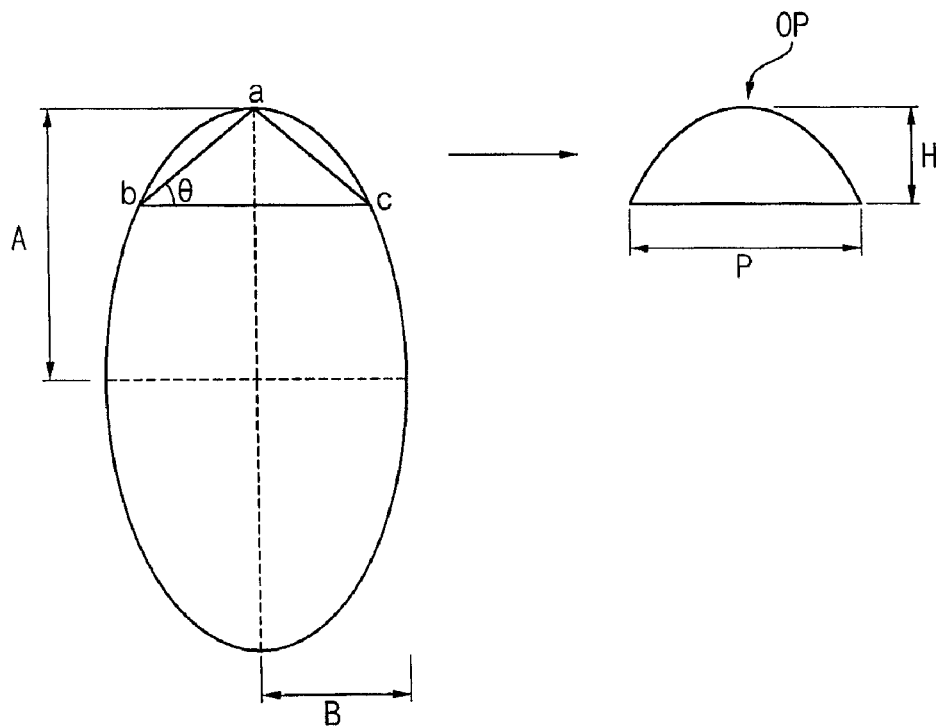
FIG. 6 is a cross-sectional view illustrating a hypothetical ellipse used in a process of defining a shape of each of the optical patterns of the optical plate shown in FIG. 2.

FIG. 6 is a cross-sectional view illustrating a geometric shape that may be used in a process of determining a shape of optical patterns of an optical plate shown in FIG. 2.

Referring to FIGS. 4 and 6, a cross-section of each of the optical patterns OP may have an elliptical arch shape.

A ratio A/B of a short (minor) radius B to a long (major) radius A of a hypothetical ellipse from which the elliptical arch shape is obtained may be about 1.4 to about 2.2. Preferably, the ratio A/B of a short radius B to a long radius A of the hypothetical ellipse may be about 1.4 to about 1.7.

A length P of a lower side of the elliptical arch shape may be about 100 μm to about 300 μm. Preferably, the length P of the lower side of the elliptical arch shape may be about 190 μm to about 210 μm. In addition, a height H of the elliptical arch shape along a longitudinal direction thereof may be about 50 μm to about 100 μm. Preferably, the height H of the elliptical arch shape along the longitudinal direction thereof may be about 80 μm to about 90 μm.

The cross-section of the elliptical arch shape defines a hypothetical isosceles triangle at first and second points b and c along the lower side of the elliptical arch shape and an apex 'a' of the elliptical arch shape. The base of the triangle becomes length P of the corresponding OP. A lower corner angle θ of the isosceles triangle is between about 36 degrees and about 48 degrees. Preferably, the lower corner angle θ of the isosceles triangle is between about 38 degrees and about 41 degrees.

The light generated from the lamps 300 is incident into the optical plate 400. A portion of the light incident into the optical plate 400 passes through the optical patterns OP, and a remainder of the light incident into the optical plate 400 is totally reflected by the optical patterns OP. Thus, the light is uniformly diffused by the optical plate 400, thereby improving luminance uniformity.

The size of the optical patterns OP formed on each of the optical plates 400 may be determined by the above-described shape. However, the optical patterns OP of each of the optical plates 400 may have various shapes.

For example, the optical patterns OP of the first optical plate 400a (shown in FIG. 3) may have different sizes from the optical patterns OP of the second optical plate 400b (shown in FIG. 3).

Figure 7:
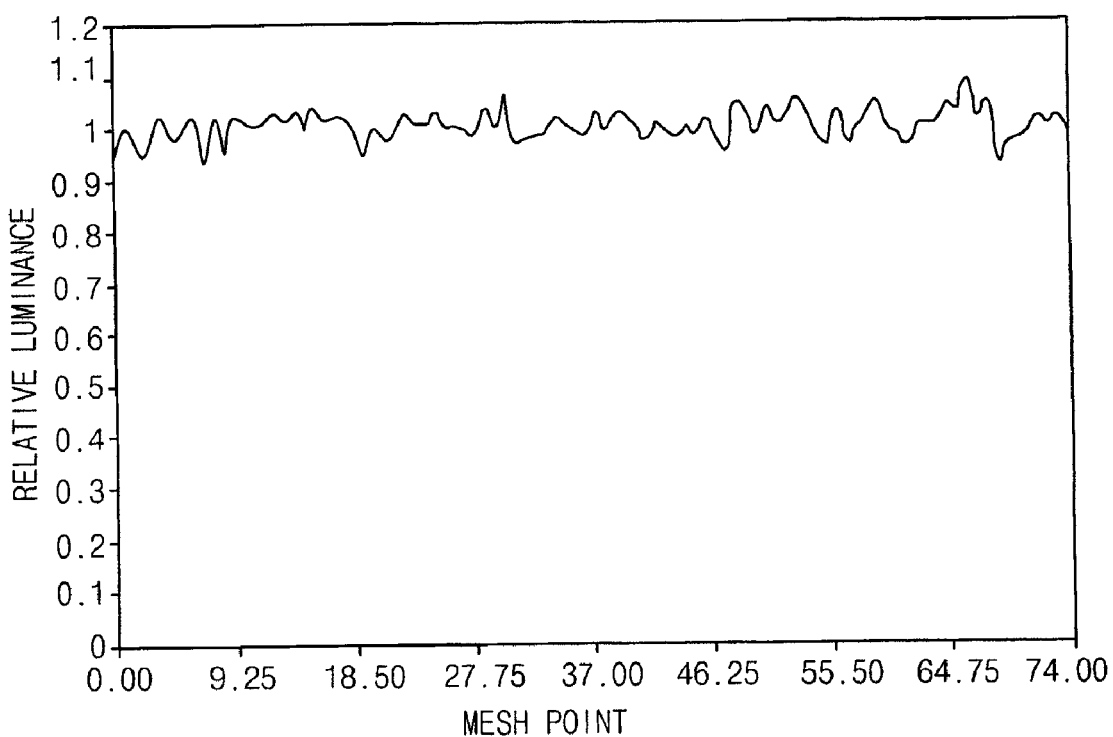
FIG. 7 is a graph illustrating luminance uniformity of observed light after the lamp sourced light has passed through the plural optical plates shown in FIG. 2.

FIG. 7 is a graph illustrating the luminance uniformity of light having passed through optical plates shown in FIG. 2.

Referring to FIGS. 2, 4 and 7, relative luminance with respect to a location on the optical plates 400 was detected.

The distance L between the adjacent lamps 300 was in the range of about 22 mm to about 24 mm, and the distance D1 between the bottom plate 210 and the lamps 300 was about 3.5 mm. The distance D2 between the lamps 300 and the optical plates 400 was about 7 mm, and the thickness of each of the optical plates 400 was about 1.2 mm. The length P of the lower side of each of the optical patterns OP was about 200.mu.m, and the height H of each of the optical patterns OP was about 85.mu.m.

The relative luminance of FIG. 7 was obtained by dividing a luminance on the optical plates 400 along the second direction DI2 that is substantially perpendicular to the longitudinal direction of the lamps 300 by an average luminance. For example, the relative luminance was obtained by dividing the luminance on mesh points of the optical plates 400 by the average luminance. The mesh points were defined between the adjacent lamps 300, and are spaced apart from each other by a constant interval.

In FIG. 7, the relative luminance was between about 0.9 to about 1.1, so that the luminance uniformity of the light having passed through the optical plates 400 was improved.

Figure 8:
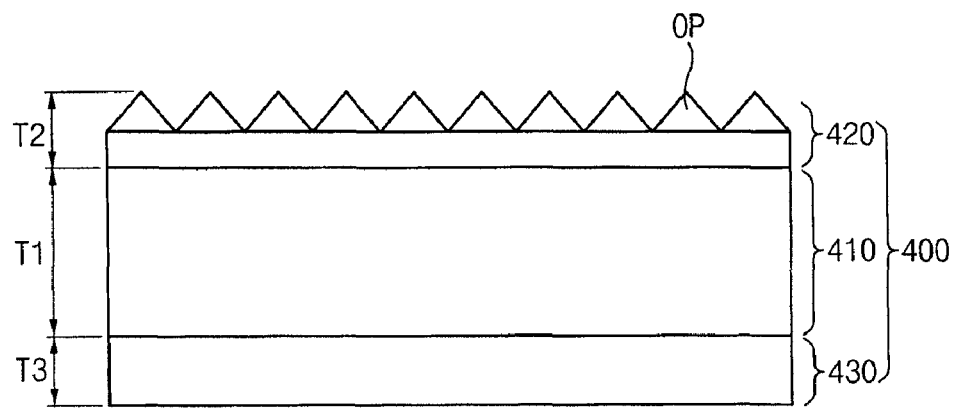
FIG. 8 is an enlarged cross-sectional view illustrating an optical plate including optical patterns in accordance with another embodiment.
Figure 9:
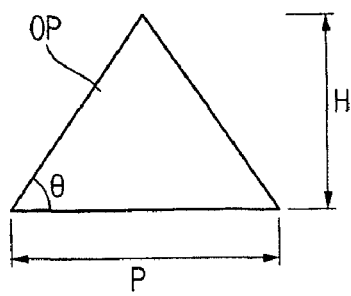
FIG. 9 is an enlarged cross-sectional view illustrating an optical pattern shown in FIG. 8.

FIG. 8 is an enlarged cross-sectional view illustrating an optical plate including optical patterns in accordance with another embodiment of the present invention. FIG. 9 is an enlarged cross-sectional view illustrating an optical pattern shown in FIG. 8.

Referring to FIGS. 8 and 9, each of optical patterns OP formed on an upper layer 420 of each of the optical plates 400 may have a cross-section substantially that of an isosceles triangular shape. A lower side (base) of the isosceles triangular shape is substantially parallel with an upper surface of the upper layer 420.

For example, a length P of a lower side (base) of the isosceles triangular shape may be about 100 μm to about 300 μm. In one sub-embodiment, the length P of the lower side of the isosceles triangular shape may be about 190 μm to about 210 μm. The height H of the isosceles triangular shape may be about 50 μm to about 100 μm. In one sub-embodiment, the height H of the isosceles triangular shape may be about 80 μm to about 90 μm. A lower corner angle θ of the isosceles triangle is between about 36 degrees and about 48 degrees. In one sub-embodiment, the lower corner angle θ of the isosceles triangle is between about 38 degrees and about 41 degrees.

Figure 10:
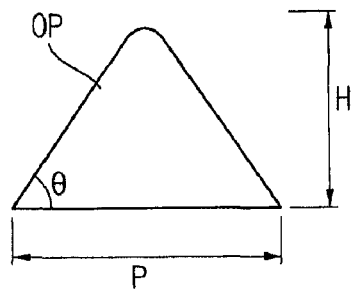
FIG. 10 is a cross-sectional view illustrating an optical pattern having a rounded apex in accordance with still another embodiment.

FIG. 10 is a cross-sectional view illustrating an optical pattern having a rounded apex in accordance with still another embodiment.

Referring to FIG. 10, each of optical patterns OP formed on an upper layer 420 of each of the optical plates 400 may have a cross-section of an isosceles triangular shape having a rounded apex as shown.

In FIG. 10, the optical patterns OP extended in a first direction DI1 are disposed on the optical plates 400, so that the light generated from the lamps 300 is diffused by the optical plates 400 to increase luminance uniformity. Thus, the thickness of the backlight assembly BLU may be decreased.

For example, the backlight assembly BLU including two optical plates 400 has greater luminance uniformity than a backlight assembly having a single diffusion plate including scattering agents.

For example, the backlight assembly including the single diffusion plate may have an optimized thickness of about 35 mm due to need for greater distance between the lamps and the single plate diffusion member. However, the backlight assembly BLU in accordance with the present disclosure that has at least two optical plates 400a,b may have a thickness of about 18 mm to about 25 mm due to the ability to have a lesser distance between the lamps and the multi-plate diffusion member. Thus, the thickness of the backlight assembly BLU including the two optical plates 400 is smaller than that of the backlight assembly including the single optical plate by more than about 10 mm.

When the single diffusion plate includes high density diffusing agents, light transmittance may be decreased. However, the plural optical plates 400a,b shown in FIG. 10 do not include the high density diffusing agent but instead include the transparent material having a relatively high light transmittance of more than about 80%, thereby increasing the light output efficiency of the backlight assembly BLU.

Figure 11:
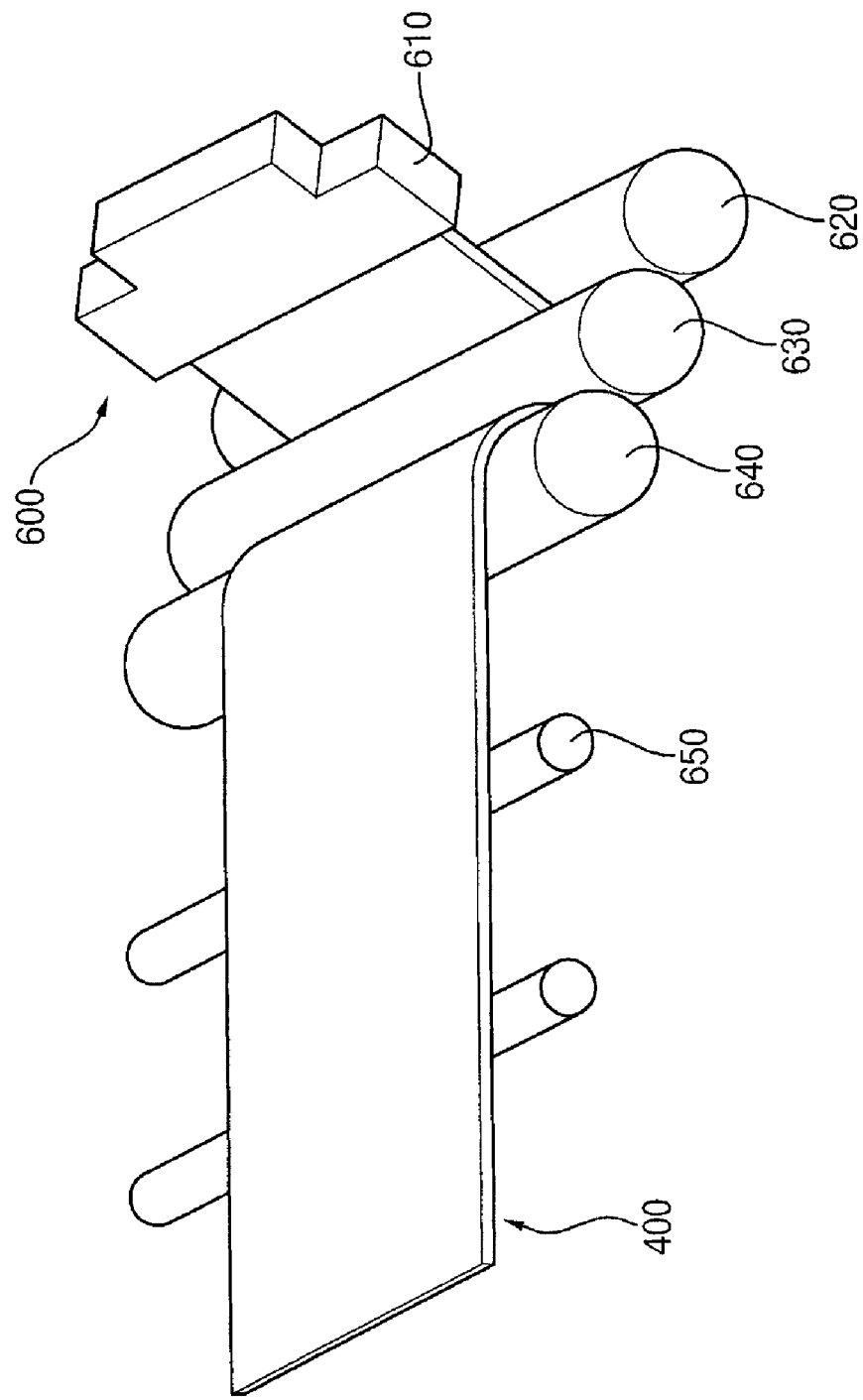
FIG. 11 is a perspective view illustrating an apparatus for manufacturing an optical plate shown in FIG. 2.
Figure 12:
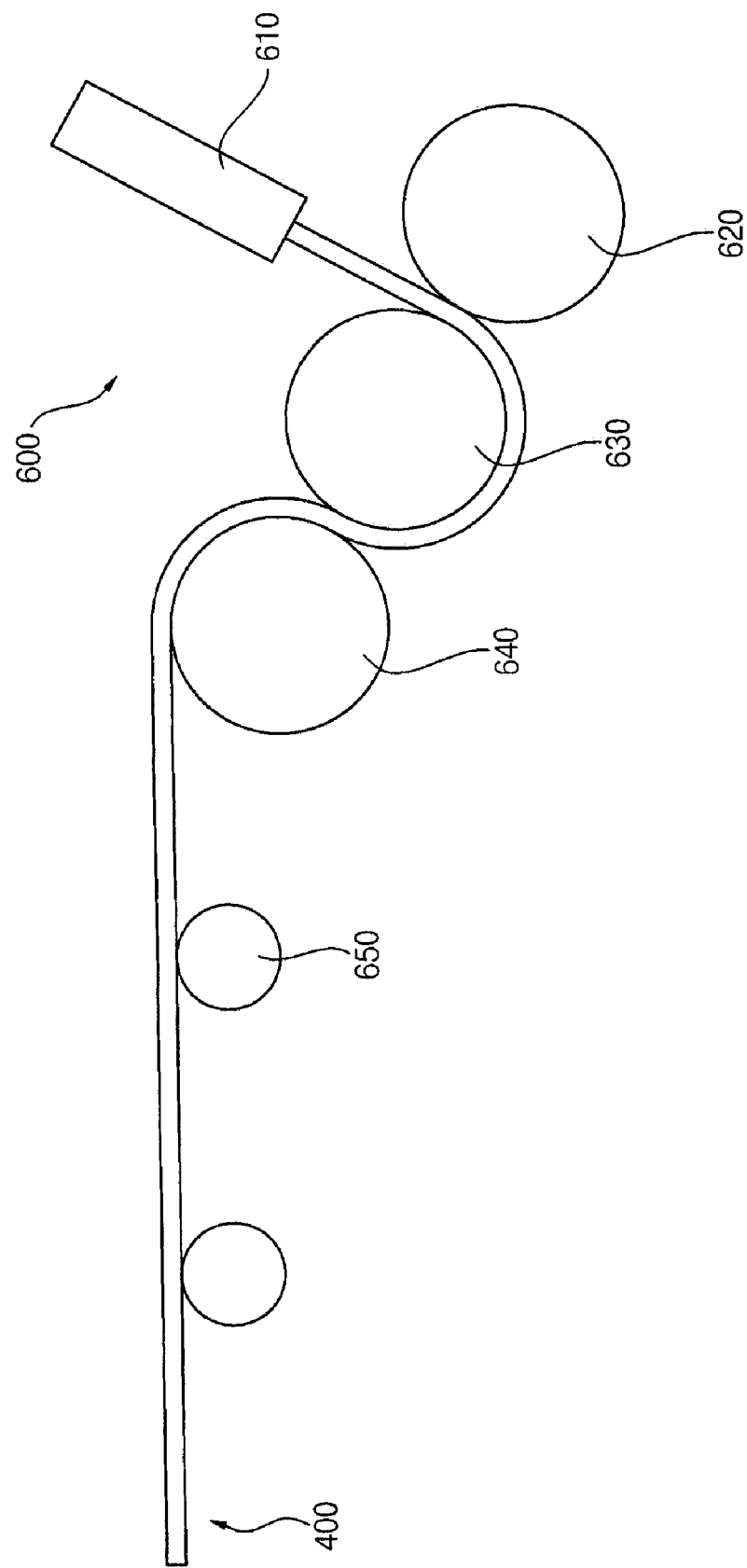
FIG. 12 is a cross-sectional view illustrating the apparatus shown in FIG. 11.

FIG. 11 is a perspective view illustrating an apparatus that may be used for manufacturing an optical plate 400 such as shown in FIG. 2. FIG. 12 is a cross-sectional view illustrating the apparatus shown in FIG. 11.

Referring to FIGS. 2, 5, 11 and 12, the apparatus 600 for manufacturing the optical plate 400 includes an extruder 610, a first roller 620, a second roller 630, a third roller 640 and a plurality of conveyor rollers 650.

The extruder 610 melts and extrudes therefrom a high optical transmittance polymer between the first and second rollers 620 and 630 to form the optical plate 400. For example, the extruder 610 forms the main core layer 410, and the upper and lower layers 420 and 430 are formed on the upper and lower surfaces of the main core layer 410.

The main core layer 410, the upper layer 420 and the lower layer 430 may include substantially the same transparent material as each other. For example, the transparent material may have a light transmittance of more than about 80%. The transparent material that may be used for the main core layer 410, the upper cladding layer 420 and the lower cladding layer 430 may have high viscosity.

The first roller 620 faces the second roller 630. The first roller 620 presses the lower layer 430 of the optical plate 400, and the second roller 630 presses the upper layer 420 of the optical plate 400.

The first roller 620 has a randomly shaped embossing part (not shown), so that the random patterns RP may be formed on the lower surface of the lower cladding layer 430. The second roller 630 has an elliptically shaped embossing part (not shown), so that the optical patterns OP may be formed on the upper surface of the upper cladding layer 420.

The third roller 640 faces the second roller 630. The third roller 640 presses the lower surface of the optical plate 400 that has been rolled along the second roller 630. Alternatively, a randomly shaped embossing part may be formed on an outer surface of the third roller 630 to form the random patterns RP on the lower surface of the optical plate 400.

The conveyor rollers 650 are spaced apart from the third roller 640, and are aligned substantially in parallel with each other. The conveyor rollers 650 transport the optical plate 400 that has been rolled along the third roller 640 and allows the latter to cool and harden after having been formed by the upstream rollers.

The optical plate 400 that has been transported by the conveyor rollers 650 is cut by a downstream cutting unit (not shown) to a predetermined size appropriate for use in a corresponding display device.

While the present disclosure has made reference to the exemplary embodiments, it should be evident that many alternative modifications and variations will become apparent to those having skill in the art in light of the foregoing description. Accordingly, the present disclosure is intended to embrace such alternative modifications and variations as falling within the spirit and scope of the disclosure.

What is claimed is:

1. A backlight assembly comprising:
   a plurality of lamps each having an elongated cylindrical shape that is elongated in a first direction, where the lamps are distributively arranged equidistant from each other along a second direction that is substantially perpendicular to the first direction, each of the cylindrical, elongated and equidistant lamps having a respective major axis extending centrally through its cylindrical shape, the plurality of major axes of the lamps being disposed in a shared plane;
   a multi-plate diffusion member having a lowest surface disposed parallel to the shared plane of the major axes of the lamps and having at least first and second optical plates, each of the optical plates including a plurality of optical patterns on a surface thereof facing away from the lamps, the optical patterns being extended in the first direction and distributed along the second direction; and
   a receiving container including a bottom plate and a sidewall formed on an edge of the bottom plate to define a receiving space that receives the lamps and the diffusion member,
   wherein a first distance (L) between the major axes of adjacent ones of the equidistant lamps is greater than a second distance (D2) between the major axes of the lamps and the lowest surface of the diffusion member so that L is more than two times D2 but not greater than about four times D2,
   wherein each of the optical patterns has an elliptical arch shape as its cross-section, the elliptical arch shape being defined as a sliced section hypothetically formed by slicing a hypothetical ellipse with a hypothetical line extending parallel to a minor radius (B) of the hypothetical ellipse,
   wherein a ratio between the minor radius (B) of the hypothetical ellipse and a major radius (A) of the hypothetical ellipse is about 1.4 to about 2.2,
   wherein a length (P) of a base portion of the elliptical arch shape is about 100 μm to about 300 μm, and a height of the elliptical arch shape is about 50 μm to about 100 μm, and
   wherein each given one of the first and second optical plates comprises:
      a main core layer;
      an upper cladding layer disposed on a first surface of the main core layer and having optical patterns defined thereon for dispersing light to an area above the given optical plate; and
      a lower cladding layer disposed on a second surface of the main core layer to face a light source, the second surface of the main core layer being opposite to the first surface of the main core layer,
      wherein a thickness of the main core layer is about 0.8 mm to about 1.5 mm,
      wherein a thickness of the upper cladding layer is about 50 μm to about 150 μm, and a thickness of the lower cladding layer is about 50 μm to about 150 μm.

2. The backlight assembly of claim 1, wherein the elliptical arch shape can be inscribed by a hypothetical isosceles triangle whose base is the same as the base portion of the elliptical arch shape and whose apex lies on the elliptical arch of the elliptical arch shape, the hypothetical isosceles triangle having a lower corner angle between about 36 degrees and about 48 degrees.

3. The backlight assembly of claim 1, wherein the second distance (D2) between the lamps and the diffusion member is greater than a third distance (D1) between the bottom plate and the lamps by about one time to about three times.

4. The backlight assembly of claim 3, wherein the second distance (D2) between the lamps and the diffusion member is about 7 mm to about 10 mm, and
   the third distance (D1) between the bottom plate and the lamps is between about 3 mm to about 5 mm.

5. The backlight assembly of claim 4, wherein the first distance (L) between adjacent lamps is about 18 mm to about 25 mm.

6. The backlight assembly of claim 1, wherein a plurality of random patterns is formed on a lower surface of the lower cladding layer facing the light source.

7. The backlight assembly of claim 6, wherein an average roughness of the random patterns along a central line is about 2 to about 4.

8. The backlight assembly of claim 1, wherein each of the optical plates comprises a transparent material having light transmittance of more than about 80%.

9. A display device comprising:
   a display panel that is configured to display an image using externally supplied light; and
   a backlight assembly disposed under the display panel to provide the display panel with the externally supplied light, the backlight assembly including:
   a plurality of lamps each having an elongated rod shape that is extended in a first direction, where the lamps are distributively arranged along a second direction that is substantially perpendicular to the first direction, where the lamps each have a respective major axis extending centrally through its rod shape, the plurality of major axes of the lamps being disposed in a shared plane, the major axes being distributively arranged equidistant from each other along the second direction;
   a diffusion member having an uppermost surface and a lowest surface both disposed parallel to the shared plane of the major axes of the lamps and having at least two optical plates, each of the optical plates including a plurality of optical patterns on a surface opposite to the lamps, and the optical patterns being extended in the first direction and aligned along the second direction;

optical sheets disposed over the diffusion member to improve optical characteristics; and a receiving container including a bottom plate and a sidewall formed on an edge of the bottom plate to receive the lamps, the diffusion member and the optical sheets, wherein a first distance (L) between the major axes of adjacent ones of the equidistant lamps is greater than a second distance (D2) between the major axes of the lamps and the lowest surface of the diffusion member so that L is more than two times D2 but not greater than about four times D2, wherein each of the optical patterns has an elliptical arch shape as its cross-section, the elliptical arch shape being defined as a sliced section hypothetically formed by slicing a hypothetical ellipse with a hypothetical line extending parallel to a minor radius (B) of the hypothetical ellipse, wherein a ratio between the minor radius (B) of the hypothetical ellipse and a major radius (A) of the hypothetical ellipse is about 1.4 to about 2.2, wherein a length (P) of a base portion of the elliptical arch shape is about 100 μm to about 300 μm, and a height of the elliptical arch shape is about 50 μm to about 100 μm, and wherein each given one of the two optical plates comprises:
a main core layer;
an upper cladding layer disposed on a first surface of the main core layer and having optical patterns defined thereon for dispersing light to an area above the given optical plate; and
a lower cladding layer disposed on a second surface of the main core layer to face a light source, the second surface of the main core layer being opposite to the first surface of the main core layer, wherein a thickness of the main core layer is about 0.8 mm to about 1.5 mm, wherein a thickness of the upper cladding layer is about 50 μm to about 150 μm, and a thickness of the lower cladding layer is about 50 μm to about 150 μm.

* * * * *